United States Patent [19]
Jensen et al.

[11] Patent Number: 5,975,842
[45] Date of Patent: Nov. 2, 1999

[54] SENSOR ARRANGEMENT

[75] Inventors: Niels Due Jensen, Bjerringbro; Jørgen Schmidt, Hadsund, both of Denmark

[73] Assignee: Grundfos a/s, Bjerringbro, Denmark

[21] Appl. No.: 09/007,113

[22] Filed: Jan. 14, 1998

[30] Foreign Application Priority Data

Jan. 14, 1997 [DD] German Dem. Rep. .......... 197 00 965

[51] Int. Cl.$^6$ ................................ F01B 25/26; G01K 1/08
[52] U.S. Cl. ............................................ 415/118; 374/143
[58] Field of Search ............................. 415/118; 73/174; 374/143

[56] References Cited

U.S. PATENT DOCUMENTS

| | | | |
|---|---|---|---|
| 3,439,356 | 4/1969 | Kinzer | 374/143 X |
| 3,808,601 | 4/1974 | Kolb et al. | 374/173 X |
| 4,028,943 | 6/1977 | Hyanova et al. | 374/143 |
| 5,070,706 | 12/1991 | Waters et al. | 374/143 X |
| 5,070,732 | 12/1991 | Duncan et al. | 374/143 X |
| 5,199,297 | 4/1993 | Lin et al. | 374/143 X |
| 5,199,789 | 4/1993 | Mauric | 374/143 |

FOREIGN PATENT DOCUMENTS

| | | | |
|---|---|---|---|
| 611255 | 9/1926 | France | 374/143 |
| 821050 | 11/1937 | France | 374/143 |
| 2691802 | 12/1993 | France | 374/143 |
| 683203 | 11/1939 | Germany | 374/143 |
| 3111708 | 10/1982 | Germany | 374/143 |
| 243107 | 2/1987 | Germany | 374/143 |
| 38 28 207 | 2/1990 | Germany . | |
| 39 20 185 | 1/1991 | Germany . | |
| 4225879 | 2/1993 | Germany | 374/143 |
| 195 44 173 | 6/1997 | Germany . | |
| 1-191029 | 8/1989 | Japan | 374/143 |
| 830153 | 5/1981 | Russian Federation | 374/143 |
| 1448219 | 12/1988 | Russian Federation | 374/143 |
| 91/15740 | 10/1991 | WIPO | 374/143 |

*Primary Examiner*—John E. Ryznic
*Attorney, Agent, or Firm*—Cohen, Pontani, Lieberman & Pavane

[57] ABSTRACT

A sensing device for measuring temperature and pressure of a fluid medium in a pump housing. The device includes a common housing for containing a temperature sensor and a differential pressure sensor. The housing includes a temperature-sensor housing portion and a pressure-sensor housing portion disposed along a common axis. The temperature-sensor housing portion has a substantially cylindrically shaped projection configured for insertion into a corresponding bore in the pump housing and which sealingly encapsulates the temperature sensor therewithin. The projection has pressure measurement apertures defined in its side wall near the free end of the projection for communicating fluid pressures in the pump housing to the differential pressure sensor which is sealingly enclosed within the pressure-sensor housing portion.

15 Claims, 2 Drawing Sheets

SENSOR ARRANGEMENT

BACKGROUND OF THE INVENTION

The invention relates to a sensor arrangement for a centrifugal pump unit.

Rotary speed controlled centrifugal pump units are considered these days as the state of the art. In particular with circulatory pumps employed in heating installations, the rotary speed control serves for adapting the pump power as optimally as possible to the respective operation condition of the installation, on the one hand to be able to operate the installation as advantageously as possible with respect to energy, and on the other hand to avoid flow noise in the installation. Whilst with pump units with radial wheels, in particular of a small construction and a comparitively low rotary speed, the control variable (rotary speed of the pump) may be effected in a simple manner by acquisition of the electrical variables of the driving motor, with centrifugal pump units of a greater power, higher rotary speed and in particular with pump units with a semi-axial impeller it is demanded that hydraulic variables of the pump are acquired, since in this region the electrical variables of the driving motor behave almost independently of the rotary speed. Such an acquisition of hydraulic variables is clearly more complicated and is today as a rule carried out with the help of an external differential pressure gauge, which via lead connections is connected between the pressure connection piece and the suction connection piece of the pump. Such an arrangement is known for example from DE 39 23 027 A1.

The mounting of such an external differential pressure gauge is complicated, since apart from the electronic apparatus to be separately supplied, a tubing must be effected thereto. This tubing is not only complicated with respect to assembly, but is also sensitive, since these relatively thin tubes may easily be damaged by mechanical external influences.

Furthermore modern frequency converter controlled centrifugal pumps are not only rotary speed controlled but are also variable in their control characteristic. In order to adapt the control characteristic in a suitable manner to the respective operating condition of the installation, it has been shown to be useful to acquire the temperature of the medium to be delivered. This may be effected by a separate sensor for example arranged in the pump housing, which however brings with it corresponding changes on the pump housing side and furthermore necessitates also a separate wiring.

SUMMARY OF THE INVENTION

Proceeding from this it is the object of the present invention to create a sensor arrangement for a centrifugal pump unit which comprises a differential pressure sensor as well as a temperature sensor and avoids the previously mentioned disadvantages.

For achieving this object the invention provides for a differential pressure sensor and a temperature sensor to be arranged in a common sensor housing and with this to so form at least one part of the sensor housing that it may be incorporated into the pump housing. With this the temperature sensor is arranged in the sensor housing part provided for incorporation into the pump housing and the differential presssure sensor is communicatingly connected via channels to the pressure measurement connections which lie in the sensor housing part provided for incorporation into the pump housing.

Such a sensor arrangement is particularly favorable since it schedules the differential pressure sensor as well as the temperature sensor in a common sensor housing, wherein the temperature sensor lies in the sensor housing which can be incorporated into the pump housing, so that it is arranged as close as possible to the pump and thus to the delivery medium. The differential pressure sensor in contrast may be arranged at a suitable other location in the sensor housing, preferably outside the pump housing, and is only connected via communicating channels to pressure measurement connections which lie in the sensor housing part provided for incorporation into the pump housing.

Such an arrangement is also particularly favorable since on the pump housing side only the suitable receiver for the sensor housing must be provided into which in turn channels open, these being connected to the pressure or suction side of the pump in a communicating manner. These channels lie protected in the pump housing and are already provided on manufacture of the pump housing. Thus complicated tubings are done away with. The design on the pump housing side required for the sensor arrangement according to the invention is the subject-matter of the subsequently published German patent application 195 44 173.7, to which it is expressly referred to here, and which is attached to this application as an enclosure.

Although it is known with modern differential pressure sensors constructed with semi-conductor technology, to provide these with a temperature sensor, the temperature sensor applied in this case is however in no way suitable to acquire the temperature of the delivery medium since it is actually namely arranged directly on the differential pressure sensor and only serves the temperature compensation of the differential pressure measurement. The temperature sensor in the sense of the invention is thus a separate temperature sensor and not that which is provided for temperature compensation on the differential pressure sensor.

The invention thus underlies the concept of incorporating the temperature sensor, provided for the temperature measurement of the delivery medium, as deep as possible into the pump housing, whilst the differential pressure sensor with, where appropriate, the temperature sensor located thereon, is to be seated a far as possible outside of the pump housing, in order not to subject the sensitive semiconductor electronics to the high temperatures of the pump housing. On the other hand however both sensors are arranged in a common sensor housing, which brings with it considerable advantages. Thus on the pump housing side only a common receiver for incorporating the sensor housing is provided. Furthermore a common cabling is possible, i.e. a common cable lead from the sensor housing to the remaining electronics of the pump.

It is advantageous when the sensor housing part provided for the incorporation into the pump housing comprises an essentially rotationally symmetric projection, which comprises one or more cylindrical or conical sections, and which can be sealingly introduced into a correspondingly formed bore of the pump housing, into which the channels open, these channels being connected in a communicating manner to the pressure and suction connection of the pump. Such a rotationally symmetrical projection in the manner of a plug or stepped plug is simple to seal with respect to the corresponding receiver bore of the pump housing and is easy to mount, for example by way of an O-ring.

Preferably the differential pressure sensor is arranged in the sensor housing lying outside the pump housing, in order to make the differential pressure sensor largely thermally independent of the pump housing. By way of suitable cooling, e.g ribbing the sensor housing, the differential pressure sensor and the electronics allocated to this and preferably arranged within the sensor housing may be maintained at a significantly lower temperature level that the pump housing, which has the result that less expensive electronic components may be employed or the electronic components may reliably operate also at a higher temperature of the delivery medium and thus of the pump housing.

In order to reliably and simply attach the sensor housing on the pump housing there is provided a flange-like housing part which connects onto the projection and which comprises bores for screw attachment onto the pump housing.

The sensor housing is advantageously constructed of essentially three housing parts, which are designed as moulded parts, for example plastic injection-moulded parts. At the same time the flange-like housing part with the projection is formed as a housing part and the remaining housing part lying outside the pump housing is formed from two housing halves, which with the incorporation of the connection cable and various things built in, are connected to one another and then connected to the housing part comprising the projection and the flange-like part. By way of the one-piece design of the projection and of the flange-like housing part it is achieved that only one housing part is to be sealed with respect to the pump housing. Thus due to varying heat expansions within the sensor housing no leakages with respect to the pump housing may occur. Also the assembly of the sensor housing has no influence on the tightness of the connection to the pump housing.

The two halves of the housing forming the remaining sensor housing part accomodate the differential pressure sensor, further electronic components, for example a rearwardly arranged circuit board, as well as the passage of the connection cable. Although, for the functioning of this box-like component, the location of the partition plane between the housing and the cover or between the housing halves is freely selectable per se, an arrangement however of the partition plane transversely to the longitudinal axis of the projection is advantagous from many points of view. Apart from the simple assembly of the components to be incorporated therebetween, above all there is to be emphasized the possibility of designing the two housing halves identically i.e. to be able to manufacture them with the same injection moulding tool.

The end face connection of the two housing halves to the flange-like housing part with the projection formed thereon results in a particularly high stability of the sensor housing since the flange-like housing part is directly mounted onto the pump housing and thus forms the carrying base of the sensor housing. Preferably this flange-like housing part is provided with intermediate walls forming chambers, so that there is formed an air cushion to the remaining sensor housing, which reduces the heat transfer from the pump housing into the sensor housing.

In order to lead the temperature sensor for determining the temperature of the medium to be delivered as close as possible to this medium, it is useful to arrange the temperature sensor near to the free end of the projection. A direct contact of the temperature sensor with the medium to be delivered has shown in practice not to be advantageous, since in particular on delivery of aggressive mediums a special encapsulation of the temperature sensor is to be provided. Moreover the sealing of the lead guides is to be ensured. From this point of view it is considerably more favorable to arrange the temperature sensor within the projection near to the free end and to use the sensor housing for a pressure tight encapsulation, since this must in any case be brought into contact with the delivery medium.

Pressure measurement connections are usefully also arranged near to the free end of the projection. Preferably the corresponding channel openings are not provided on the end face of the projection but on its peripheral surface, this being displaced about approx. 180° to one another. In this manner a good sealing and a secure lead connection are guaranteed.

The differential pressure sensor itself is preferably incorporated into a holder and protected on both sides by membranes. This holder provided with membranes may be manufactured as a separate constructional unit, which then on assembly of the sensor housing is appropriately incorporated between the sensor housing halves, just as the connection cable introduced here as well as the remaining electronics: these remaining electronics are usefully arranged on a connection circuit board which is incorporated transversely to the partition plane of the housing halves and between these with a positive fit, and which serves the connection of the electrical connection cable on the one hand and on the other hand of the differential pressure sensor as well as the temperature sensor. This circuit board thus forms the basis for the wiring for all components. Apart from the remaining electronics it carries the soldering locations connecting the components to one another. This connection circuit board lies in the sensor housing part which is furthest away from the pump housing so that here the lowest temperature level is achieved. By way of this arrangement also here comparatively temperature sensitive electronic components may be employed which e.g. would not be able to be employed within the pump housing for reasons of temperature.

In order to be able to guarantee a reliable sealing between the pressure measurement connections on the projection towards the bore of the pump housing it is advantageous to provide a sealing lip on the projection, this sealing lip running parallel to the longitudinal axis of the projection and transversely over the free end face. In this way it is not necessary to produce the whole projection and the corresponding housing bore with a high fitting accuracy, since this narrow sealing lip ensures the required sealing between the pressure connections. On the other hand this sealing lip may be interrupted in a directed manner or another throttle-like channel may be formed within the projection, in order to form a connecting channel between the pressure connections. By way of this connecting channel a directed flow around the projection may be achieved in order to improve the accuracy of the temperature measurement of the delivery medium. The part backflow of the delivered medium caused by this from the pressure connection to the suction connection must be accepted, but however is so small that is can be neglected, particularly with larger centrifugal pump units.

BRIEF DESCRIPTION OF THE DRAWINGS

The invention is hereinafter described in more detail by way of one embodiment example shown in the drawings. There are shown.

DETAILED DESCRIPTION OF THE INVENTION

Figure 1:
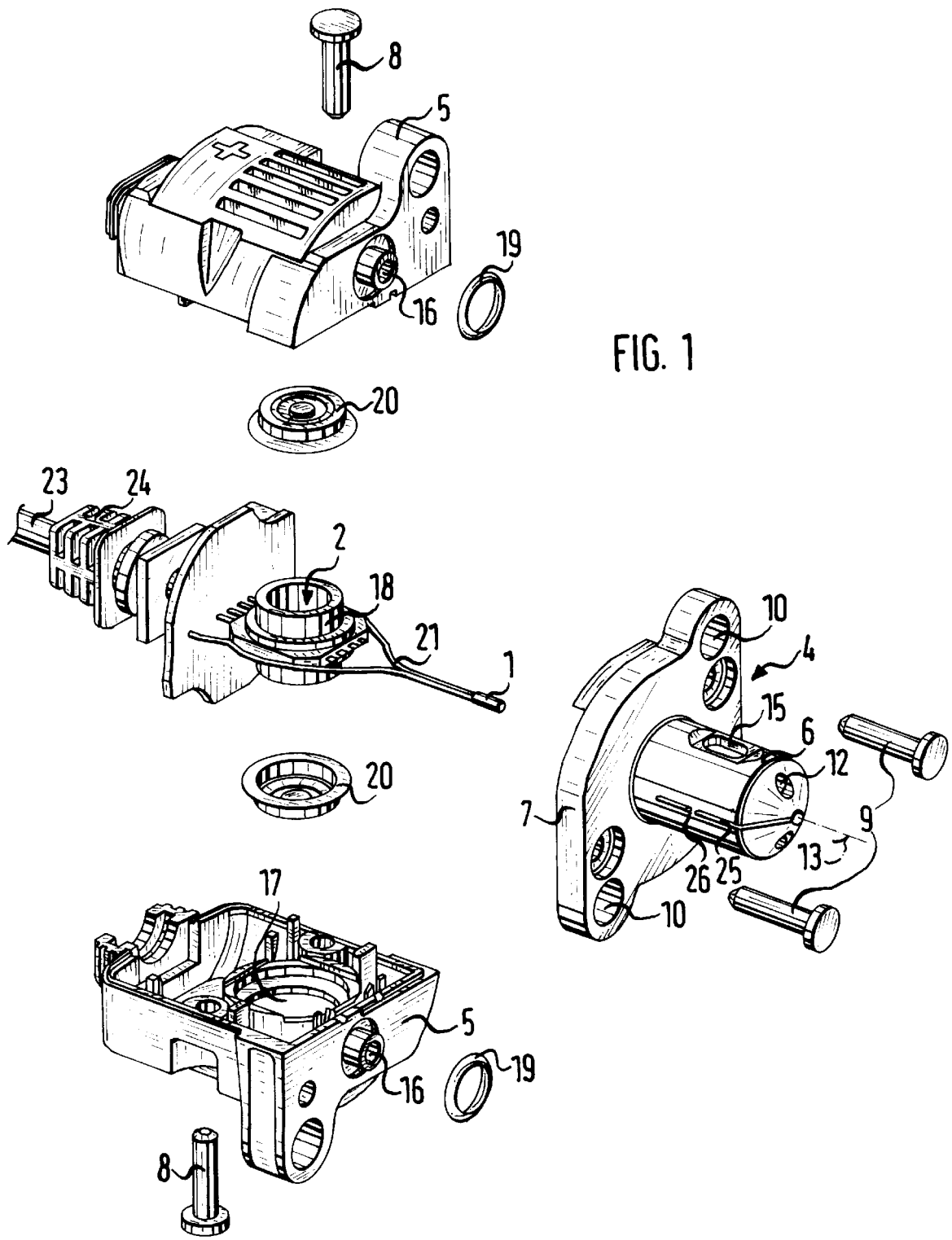
FIG. 1: a sensor arrangement according to the invention in a simplified exploded representation

The sensor arrangement represented in the figures and described in the following is for the application with a centrifugal pump unit, as is for example described in the German patent application 195 44 173.7 of the same applicant, which for avoiding repetition is expressly referred to here and is attached as an enclosure.

The sensor arrangement comprises a temperature sensor 1 and a differential pressure sensor 2 which are arranged in a common sensor housing 3. The sensor housing 3 consists essentially of three injection moulded parts, that is a front housing part 4 provided for incorporation into the pump housing and two housing halves 5 connecting rearwardly to this and forming a hollow cavity, these halves being formed identically.

The front housing part 4 consists of a plug-shaped projection 6, running out at its free end in a pointed cone-shaped manner, having an essentially cylindrical shape and connecting to a flange-like part 7 which on the rear side connects to the projection 6. The flange-like housing part 7 forms the assembly base of the whole sensor housing 3, with which this sensor housing is fixed on the pump housing. Both housing halves 5 are placed onto one another with the incorporation of the components described in detail below, and are rigidly connected to one another via two bolts 8. This so formed rear housing part is then connected to the front housing part 4, in particular the flange-like part 7, via two further bolts 9. The sensor housing 3 formed in this way is then introduced with its projection 6 into a suitable receiver bore of the pump housing, until the flange-like part 7 with the incorporation of a seal, comes to bear on a corresponding plane surface of the pump housing. The fastening is effected with two screws through bores 10 provided in the flange-like part 7.

The temperature sensor 1 sits near the front end of the projection 6 in a central inner recess 11 within the front housing part 4, this recess extending up to near the free end of the projection 6. The guiding of leads is effected likewise through this central recess 11. Neighboring this central recess 11 there are provided two oppositely directed outer recesses 12 in the end face of the projection 6, which serve the reduction of the wall thicknesses in this region.

Neighboring the central recess 11 within the projection 6 there are provided two channels 14 which are displaced to one another by 180° with respect to the longitudinal axis 13 of the projection 6 and which open into the pressure measurement connections 15 interspersing the walling, these being in alignment to corresponding channel openings in the receiver bore of the pump housing, in order in this manner to create a communicating connection between the pressure connection and the suction connection of the pump to the channels 14. The channels 14 are guided through up to the rear end of the front housing part 4 where they open into an end face collar, in each case of a housing half 5 which is connected via a channel 16 to a space 17 which is divided into two by way of a holder 18 incorporated with a positive fit between the housing halves 5 and which carries the differential pressure sensor 2. In this manner the differential pressure sensor 2 is communicatingly connected to the pressure or suction space of the pump. In order to ensure the guiding of the channels in a pressure tight manner, the collars guiding the channels 16 are in each case encompassed by an O-ring which on screwing the front housing part 4 with the rear housing part is sealingly clamped between the end faces of these housing parts.

The holder 18 is covered on both sides in each case by way of a roughly hat-shaped membrane 20 which blends into an O-ring shaped outer thickening. These membranes 20 seal the differential pressure sensor with respect to the pressure spaces 17, but however transmit the pressures prevailing here to the differential pressure sensor 2, since the free space formed between the membranes 20 and the differential pressure sensor 2 is filled with a pressure-transmitting gel.

Figure 2:
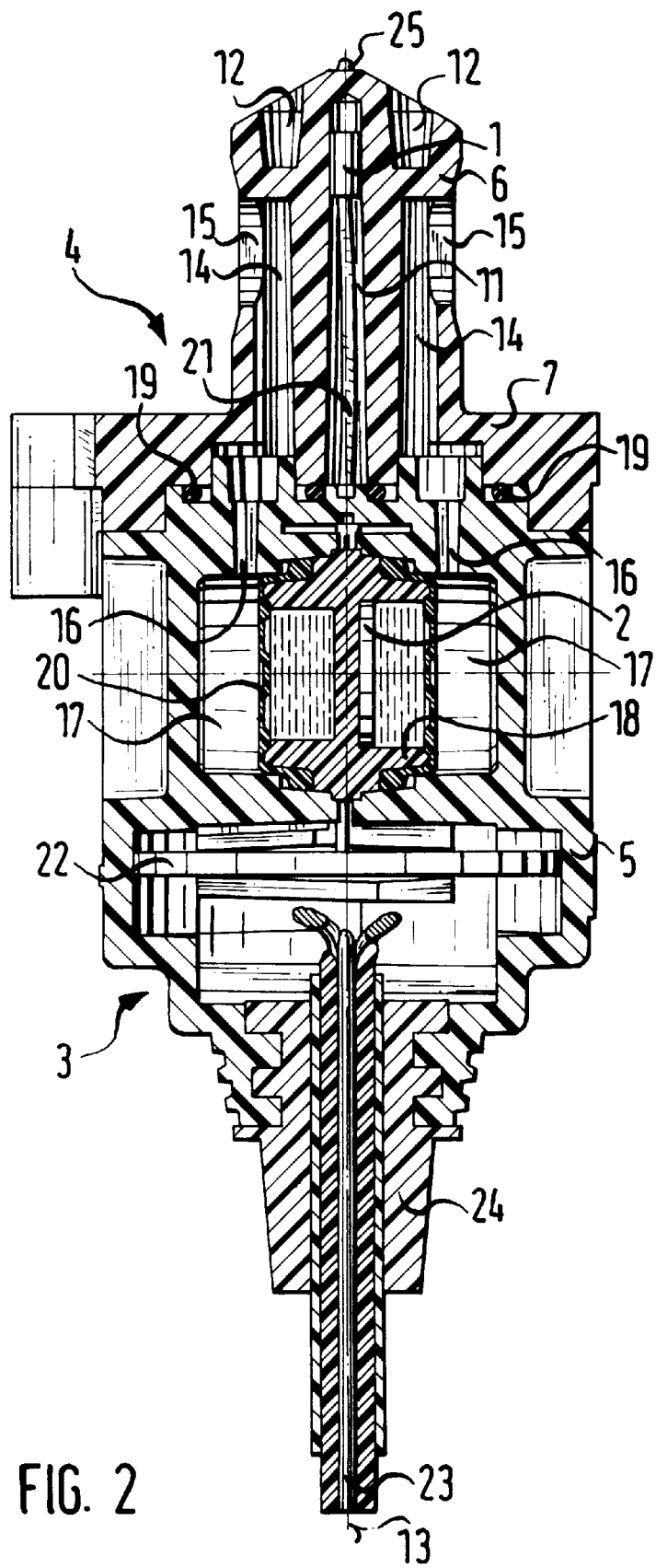
FIG. 2: a longitudinal section through the sensor arrangement.

As is shown by way of FIG. 2, the holder 18 with the membranes 20 is incorporated with a positive fit between the housing halves 5. The electrical connection leads 21 to the temperature sensor are, as indicated in FIG. 1, led around the holder 18 and together with the electrical connections of the differential pressure sensor 2, rigidly led out of the holder 18, are guided to a connection circuit board 22 which lies therebehind and transversely to the partition plane of the housing halves 5 and which carries further electronic components and to which also the connection lead 23 introduced from the sensor housing 3 from the rear side is connected. Via this lead 23, all electrical lead connections to the outside are formed. Since the central recess 11, in which the leads 21 to the temperature sensor 1 are guided, is encapsulated in a pressure tight manner, the leads guided therein may be guided around the holder 18 from the front housing part 4 into the rear housing part also without further sealing. The regions to be encapsulated and possibly pressure conducting lie next to this.

The projection 6 comprises a sealing lip 25 which in the region of the cylindrical part runs approximately parallel to the longitudinal axis 13 on both sides and is guided transversely over the end face. This sealing lip 25 serves for sealing the pressure measurement connections 15 with respect to the cylinder bore in the pump housing. With the embodiment form described by way of FIG. 1 this sealing lip comprises an interruption 26 which in combination with an appropriate receiver bore in the pump housing forms a throttle location and provides for a small-volumed, yet directed flow around the projection 6, in order to increase the accuracy of the temperature measurement. This interruption may be replaced where appropriate by a corresponding bore, or in the case where a diverted flow is not desired, may be eliminated.

We claim:

1. A sensing device for measuring temperature and pressure of a fluid medium in a housing of a pump, comprising:
    a differential pressure sensor for measuring a differential pressure of the medium in the pump housing;
    a temperature sensor for measuring a temperature of the fluid medium in the pump housing;
    a housing including a temperature-sensor housing portion in which said temperature sensor is arranged, and a pressure-sensor housing portion mounted to said temperature-sensor housing portion along a common axis, said differential pressure sensor being arranged in said pressure-sensor housing portion, said temperature-sensor housing portion having a side wall with pressure-measurement apertures arranged therethrough for communication with fluid pressures in the pump housing, said housing being configured to define pressure-communicating channels that extend from said pressure-measurement apertures to said differential pressure sensor for communicating fluid pressures in the pump housing to said differential pressure sensor.

2. The sensing device of claim 1, wherein said temperature-sensor housing portion is configured as an essentially rotationally symmetric projection having a substantially cylindrical section and receivable in a corresponding bore in the pump housing so that said temperature sensor can be placed in close proximity to the fluid medium and said pressure-measurement apertures can be placed in communication with fluid pressures in the pump housing, said projection including sealing means disposed on said temperature-sensor housing portion for sealing engagement with the corresponding bore.

3. The sensing device of claim 2, wherein said pressure-sensor housing portion containing said differential pressure sensor is mounted to the temperature-sensor housing portion so as to be disposed outside the pump housing.

4. The sensing device of claim 3, wherein said temperature-sensor housing portion has a flange portion, from which said projection protrudes, by which said housing is securable to the pump housing.

5. The sensing device of claim 4, wherein said pressure-sensor housing portion is formed by two housing half-sections, said temperature-sensor housing portion and said housing half-sections being formed from moulded parts.

6. The sensing device of claim 5, wherein the housing half-sections are configured to have a partition plane, at which the housing half-sections meet, arranged substantially along the common axis.

7. The sensing device of claim 6, wherein said pressure-sensor housing portion has an end face attached to said flange portion of said temperature-sensor housing portion.

8. The sensing device of claim 6, wherein said projection has a free end remote from said flange portion, said temperature sensor being arranged proximate the free end of the projection and encapsulated in a pressure tight manner in said projection.

9. The sensing device of claim 2, wherein the pressure-measurement apertures are formed near the free end of said projection displaced circumferentially about 180° from one another.

10. The sensing device of claim 5, further comprising a holder having a bore defined transversely therethrough and configured to support the differential pressure sensor therein, and a first and a second membrane disposed on said holder so as to seal said bore of said holder and the differential pressure sensor in the holder, said holder and said first and second membranes being disposed in said pressure-sensor housing portion formed by the two housing half-sections.

11. The sensing device of claim 8, further comprising electrical leads guided through an end of the housing remote from the free end of said projection.

12. The sensing device of claim 11, further comprising a connection circuit board disposed between said housing half-sections with a positive fit and arranged substantially transverse to the partition plane of the housing half-sections, the electrical leads being arranged within said housing to said connection circuit board.

13. The sensing device of claim 12, wherein said sealing means is a sealing lip dispose longitudinally along said projection and transversely across the free end of said projection.

14. The sensing device of claim 13, wherein said projection defines a channel therewithin for fluid communication with a suction side and a pressure side of the pump housing.

15. The sensing device of claim 13, wherein said projection defines a channel for fluid communication with a corresponding channel in said pump housing so as to connect a suction side and a pressure side of the pump housing.

* * * * *